US012633243B2

(12) United States Patent
Liu

(10) Patent No.: US 12,633,243 B2
(45) Date of Patent: May 19, 2026

(54) DRIVING CIRCUIT, DRIVING METHOD, AND DISPLAY PANEL

(71) Applicant: TCL China Star Optoelectronics Technology Co., Ltd., Shenzhen (CN)

(72) Inventor: Jinfeng Liu, Shenzhen (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/792,416

(22) PCT Filed: Jun. 30, 2022

(86) PCT No.: PCT/CN2022/102999
§ 371 (c)(1),
(2) Date: Jan. 26, 2025

(87) PCT Pub. No.: WO2023/236290
PCT Pub. Date: Dec. 14, 2023

(65) Prior Publication Data

US 2025/0182667 A1 Jun. 5, 2025

(30) Foreign Application Priority Data

Jun. 6, 2022 (CN) ......................... 202210633861.8

(51) Int. Cl.
*G09G 3/20* (2006.01)
*G09G 3/36* (2006.01)
*G09G 5/18* (2006.01)

(52) U.S. Cl.
CPC ......... *G09G 3/2092* (2013.01); *G09G 3/3614* (2013.01); *G09G 3/3696* (2013.01);
(Continued)

(58) Field of Classification Search
CPC .... G09G 2330/021; G09G 5/18; G09G 3/006; G09G 2320/068; G09G 2354/00;
(Continued)

(56) References Cited

U.S. PATENT DOCUMENTS

2008/0239229 A1* 10/2008 Park ....................... G09G 5/003 349/149
2014/0043311 A1* 2/2014 Shao .................... G09G 3/3611 345/96
(Continued)

FOREIGN PATENT DOCUMENTS

CN 104635362 A 5/2015
CN 110837195 A 2/2020
(Continued)

OTHER PUBLICATIONS

International Search Report in International application No. PCT/CN2022/102999, mailed on Dec. 2, 2022.
(Continued)

*Primary Examiner* — Dismery Mercedes
(74) *Attorney, Agent, or Firm* — Menachem Nathan; Nathan & Associates

(57) ABSTRACT

A driving circuit, a driving method, and a display panel are disclosed. The driving circuit includes: a timing controller including a first pin; a power management chip including a second pin; a first shared discharge rod, wherein the power management chip is electrically connected to the first shared discharge rod; a second shared discharge rod, wherein the power management chip is electrically connected to the second shared discharge rod. This can avoid issues of abnormal images on the display panel.

10 Claims, 3 Drawing Sheets

(52) U.S. Cl.
CPC ......... *G09G 5/18* (2013.01); *G09G 2310/061* (2013.01); *G09G 2310/08* (2013.01); *G09G 2320/068* (2013.01); *G09G 2330/021* (2013.01)

(58) Field of Classification Search
CPC ........... G09G 3/3614; G09G 2310/061; G09G 3/3696; G09G 3/3648; G09G 3/3611; G09G 2310/0243; G09G 2310/068; G09G 2310/06; G06F 1/24; G06F 1/3265; G06F 1/26
See application file for complete search history.

(56) References Cited

U.S. PATENT DOCUMENTS

| | | | | |
|---|---|---|---|---|
| 2014/0176411 | A1* | 6/2014 | Yang | G09G 3/3614 345/96 |
| 2014/0292627 | A1* | 10/2014 | Pyun | G09G 3/3614 345/96 |
| 2015/0287373 | A1* | 10/2015 | Xu | G09G 3/006 345/213 |
| 2018/0293928 | A1* | 10/2018 | Chen | G09G 3/3611 |
| 2020/0273390 | A1* | 8/2020 | Dai | G09G 3/20 |
| 2020/0410950 | A1* | 12/2020 | Chen | G09G 3/3614 |
| 2021/0174755 | A1* | 6/2021 | Liang | G09G 3/3614 |
| 2022/0208136 | A1* | 6/2022 | Tsuchi | G09G 3/3696 |
| 2022/0319394 | A1* | 10/2022 | Xiao | G09G 3/2096 |
| 2023/0339330 | A1* | 10/2023 | Lin | B60L 1/006 |

FOREIGN PATENT DOCUMENTS

| | | | |
|---|---|---|---|
| CN | 111681621 | A | 9/2020 |
| CN | 112198726 | A | 1/2021 |
| CN | 114299891 | A | 4/2022 |
| CN | 114333727 | A | 4/2022 |
| JP | 2011170048 | A | 9/2011 |

OTHER PUBLICATIONS

Written Opinion of the International Search Authority in International application No. PCT/CN2022/102999, mailed on Dec. 2, 2022.

Chinese Office Action issued in corresponding Chinese Patent Application No. 202210633861.8 dated Jan. 20, 2023, pp. 1-9.

* cited by examiner

DRIVING CIRCUIT, DRIVING METHOD, AND DISPLAY PANEL

FIELD OF THE DISCLOSURE

The present application relates to the technical field of display technologies, and more particularly, to a driving circuit, a driving method, and a display panel.

DESCRIPTION OF RELATED ART

With the continuous improvement of information technology and living standards, people have higher and higher requirements for display quality such as transmittance and viewing angle. To improve the viewing angle, pixels need to be divided into multiple domains, but this will bring about the loss of transmittance. Therefore, the viewing angle and the transmittance are inversely related to benefits. Shared discharge rod technology is a technology that can improve low gray-scale viewing angles. The shared discharge rod technology is to have two shared discharge rods on the display panel. The two shared discharge rods are respectively a positive-polarity shared discharge rod and a negative-polarity shared discharge rod. voltages of the positive-polarity shared discharge rod and the negative-polarity shared discharge rod are inverted in a blanking time interval of each frame following a data signal, thereby improving the display viewing angle.

In a practical application, there are various circuit ways to realize a voltage inversion of the shared discharge rod. The existing solution is to realize a voltage switching through an integrated circuit bus communication between a timing controller and a power management chip. The integrated circuit bus between the timing controller and the power management chip in a circuit system has only one line. In addition to the timing controller and power management chip, the integrated circuit bus is usually connected to other modules, such as a system chip or a programming socket. If the timing controller and the power management chip communicate through the integrated circuit bus, and other modules also issue commands through the integrated circuit bus, it is easy to be disturbed, resulting in issues of abnormal images.

SUMMARY OF INVENTION

Technical Problems

The present application provides a driving circuit, a driving method, and a display panel to solve issues of abnormal images of the display panel.

Solution to Problem

Technical Solutions

The application provides a driving circuit, which includes:

a timing controller comprising a first pin;

a power management chip comprising a second pin;

a first shared discharge rod, wherein the power management chip is electrically connected to the first shared discharge rod;

a second shared discharge rod, wherein the power management chip is electrically connected to the second shared discharge rod;

wherein the first pin is electrically connected to the second pin, the power management chip is configured to output voltages with opposite polarities to the first shared discharge rod and the second shared discharge rod at the same time, the power management chip is used to invert a voltage of the first shared discharge rod and a voltage of the second shared discharge rod under a control of a level signal of the first pin in a blanking time interval of each frame.

Optionally, in some embodiments of the present application, the timing controller comprises:

a controller;

a register, wherein the controller is electrically connected to the register, and the register is electrically connected to the first pin.

Optionally, in some embodiments of the present application, the timing controller further comprises:

a pulse signal generator electrically connected to the controller.

Optionally, in some embodiments of the present application, the power management chip further comprises:

a decoder, wherein an input terminal of the decoder is electrically connected to the a voltage conversion circuit, wherein the voltage conversion circuit comprises a first signal control terminal, a power supply access terminal, a first voltage output terminal, and a second voltage output terminal, the first signal control terminal is electrically connected to an output terminal of the decoder, the first voltage output terminal is electrically connected to the first shared discharge rod, and the second voltage output terminal is electrically connected to the second shared discharge rod. The voltage conversion circuit converts the voltage of the power access terminal into a first voltage and a second voltage, the first voltage and the second voltage are voltages with opposite polarities, and the voltage conversion circuit switches the voltage of the first voltage output terminal and the voltage of the second voltage output terminal between the first voltage and the second voltage under the signal control of the first signal control terminal.

Optionally, in some embodiments of the present application, the voltage conversion circuit includes a step-down control circuit.

Optionally, in some embodiments of the present application, the decoder comprises:

a second signal control terminal electrically connected to the pulse signal generator;

wherein the decoder is configured to decode the level signal of the first pin under a signal control of the second signal control terminal and then transmits the level signal of the first pin to the first signal control terminal.

Correspondingly, the present application also provides a driving method of a driving circuit, wherein the driving circuit comprises:

a timing controller comprising a first pin;

a power management chip comprising a second pin;

a first shared discharge rod, wherein the power management chip is electrically connected to the first shared discharge rod;

a second shared discharge rod, wherein the power management chip is electrically connected to the second shared discharge rod;

wherein the first pin is electrically connected to the second pin, the power management chip is configured to output voltages with opposite polarities to the first shared discharge rod and the second shared discharge rod at the same time, the power management chip is configured to invert a voltage of the first shared discharge rod and a voltage of the second shared discharge rod under a control of a level signal of the first pin in a blanking time interval of each frame;

wherein the method comprises the following steps:

wherein in the blanking time interval of each frame, the timing controller controls the level signal of the first pin to switch between a high level and a low level;

wherein the power management chip is configured to invert the voltage of the first shared discharge rod and the voltage of the second shared discharge rod under the control of the level signal of the first pin in the blanking time interval of each frame.

Optionally, in some embodiments of the present application, in the blanking time interval of each frame, the timing controller controlling the level signal of the first pin to switch between the high level and the low level comprises:

the timing controller switching the level signal of the first pin between the high level and the low level under a control of a frame start signal of each frame.

Optionally, in some embodiments of the present application, the power management chip configured to invert the voltage of the first shared discharge rod and the voltage of the second shared discharge rod under the control of the level signal of the first pin in the blanking time interval of each frame comprises:

in the blanking time interval of each frame, when the level signal of the first pin is at the high level, the power management chip outputs a positive voltage to the first shared discharge rod, and the power management chip outputs a negative voltage to the second shared discharge rod; when the level signal of the first pin is at the low level, the power management chip outputs the negative voltage to the first shared discharge rod, and the power management chip outputs the positive voltage to the second shared discharge rod.

Optionally, in some embodiments of the present application, the power management chip configured to invert the voltage of the first shared discharge rod and the voltage of the second shared discharge rod under the control of the level signal of the first pin in the blanking time interval of each frame comprises:

in the blanking time interval of each frame, when the level signal of the first pin is at the high level, the power management chip outputs a negative voltage to the first shared discharge rod, and the power management chip outputs a positive voltage to the second shared discharge rod; when the level signal of the first pin is at the low level, the power management chip outputs the positive voltage to the first shared discharge rod, and the power management chip outputs the negative voltage to the second shared discharge rod.

Optionally, in some embodiments of the present application, the timing controller comprises:

a controller;

a register, wherein the controller is electrically connected to the register, and the register is electrically connected to the first pin.

Optionally, in some embodiments of the present application, the timing controller further comprises:

a pulse signal generator electrically connected to the controller.

Optionally, in some embodiments of the present application, the power management chip further comprises:

a decoder, wherein an input terminal of the decoder is electrically connected to the second pin;

a voltage conversion circuit, wherein the voltage conversion circuit comprises a first signal control terminal, a power supply access terminal, a first voltage output terminal, and a second voltage output terminal, the first signal control terminal is electrically connected to an output terminal of the decoder, the first voltage output terminal is electrically connected to the first shared discharge rod, and the second voltage output terminal is electrically connected to the second shared discharge rod.

Optionally, in some embodiments of the present application, the decoder comprises:

a second signal control terminal electrically connected to the pulse signal generator;

wherein the decoder is configured to decode the level signal of the first pin under a signal control of the second signal control terminal and then transmits the level signal of the first pin to the first signal control terminal.

Correspondingly, the present application also provides a display panel, the display panel comprises a plurality of sub-pixels arranged in an array and a driving circuit, wherein the driving circuit comprises:

a timing controller comprising a first pin;

a power management chip comprising a second pin;

a first shared discharge rod, wherein the power management chip is electrically connected to the first shared discharge rod;

a second shared discharge rod, wherein the power management chip is electrically connected to the second shared discharge rod;

wherein the first pin is electrically connected to the second pin, the power management chip is configured to output voltages with opposite polarities to the first shared discharge rod and the second shared discharge rod at the same time, the power management chip is used to invert a voltage of the first shared discharge rod and a voltage of the second shared discharge rod under a control of a level signal of the first pin in a blanking time interval of each frame;

wherein the first shared discharge rod of the driving circuit is electrically connected to the sub-pixels of a first column, and the second shared discharge rod of the driving circuit is electrically connected to the sub-pixels of a second column.

Optionally, in some embodiments of the present application, the timing controller comprises:

a controller;

a register, wherein the controller is electrically connected to the register, and the register is electrically connected to the first pin.

Optionally, in some embodiments of the present application, the timing controller further comprises:

a pulse signal generator electrically connected to the controller.

Optionally, in some embodiments of the present application, the power management chip further comprises:

a decoder, wherein an input terminal of the decoder is electrically connected to the second pin;

a voltage conversion circuit, wherein the voltage conversion circuit comprises a first signal control terminal, a power supply access terminal, a first voltage output terminal, and a second voltage output terminal, the first signal control terminal is electrically connected to an output terminal of the decoder, the first voltage output terminal is electrically connected to the first shared discharge rod, and the second voltage output terminal is electrically connected to the second shared discharge rod.

Optionally, in some embodiments of the present application, the decoder comprises:

a second signal control terminal electrically connected to the pulse signal generator;

wherein the decoder is configured to decode the level signal of the first pin under a signal control of the second signal control terminal and then transmits the level signal of the first pin to the first signal control terminal.

Advantages of Invention

Beneficial Effects

The present application provides a driving circuit, a driving method and a display panel, wherein the driving circuit includes: a timing controller comprising a first pin; a power management chip comprising a second pin; a first shared discharge rod, wherein the power management chip is electrically connected to the first shared discharge rod; a second shared discharge rod, wherein the power management chip is electrically connected to the second shared discharge rod; wherein the first pin is electrically connected to the second pin, the power management chip is configured to output voltages with opposite polarities to the first shared discharge rod and the second shared discharge rod at the same time, the power management chip is used to invert a voltage of the first shared discharge rod and a voltage of the second shared discharge rod under a control of a level signal of the first pin in a blanking time interval of each frame. The present application uses pins to transmit level signals between the timing controller and the power management chip. Then, the power management chip controls the polarity reversal of the voltage of the first shared discharge rod and the voltage of the second shared discharge rod according to the level signal. Therefore, the issues that the level signal is disturbed and causes the display panel to produce abnormal issues can be avoided.

BRIEF DESCRIPTION OF DRAWINGS

Description of Attached Drawings

In order to illustrate the technical solutions in the embodiments of the present application more clearly, the following briefly introduces the accompanying drawings that are used in the description of the embodiments. Obviously, the drawings in the following description are only some embodiments of the present application. For those skilled in the art, other drawings can also be obtained from these drawings without creative effort.

EMBODIMENTS OF INVENTION

Detailed Description of Preferred Embodiments

The technical solutions in the embodiments of the present application will be clearly and completely described below with reference to the accompanying drawings in the embodiments of the present application. Obviously, the described embodiments are only a part of the embodiments of the present application, but not all of the embodiments. Based on the embodiments in the present application, all other embodiments obtained by those skilled in the art without creative work fall within the protection scope of the present application.

In the description of the present application, it should be understood that the terms "first" and "second" are only used for description purposes and cannot be interpreted as indicating or implying relative importance or implicitly indicating the number of indicated technical features. Thus, features defined as "first" and "second" may expressly or implicitly include one or more of the features. In the description of the present application, "plurality" means two or more, unless otherwise expressly and specifically defined.

The present application provides a driving circuit, a driving method, and a display panel, which will be described in detail below. It should be noted that the description order of the following embodiments is not intended to limit the preferred order of the embodiments of the present application.

Figure 1:
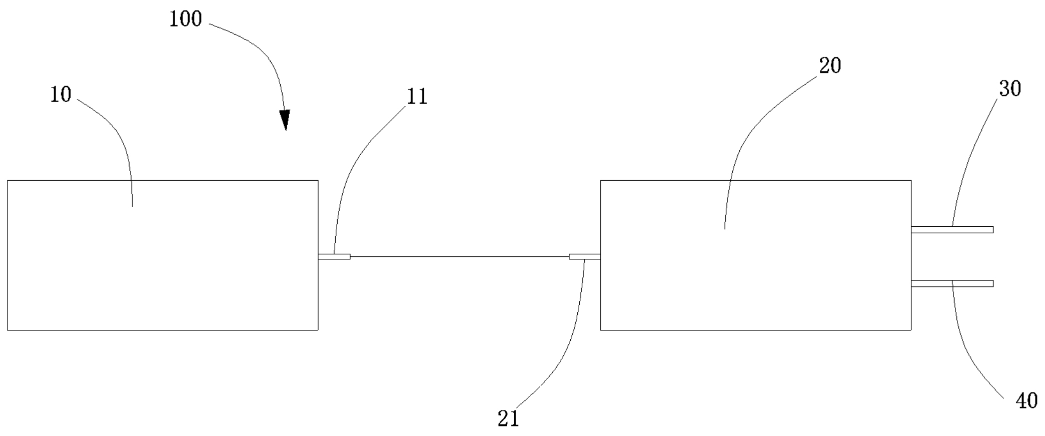
FIG. 1 is a schematic diagram of a driving circuit provided by the present application.

Refer to FIG. 1, which is a schematic diagram of a driving circuit 100 provided by the present application. The present application provides the driving circuit 100, which includes: a timing controller 10, a power management chip 20, a first shared discharge rod 30, and a second shared discharge rod 40.

The timing controller 10 includes a first pin 11. The power management chip 20 includes a second pin 21. The power management chip 20 is electrically connected to the first shared discharge rod 30. The power management chip 20 is electrically connected to the second shared discharge rod 40.

The first pin 11 is electrically connected to the second pin 21. The power management chip 20 simultaneously outputs voltages with opposite polarities to the first shared discharge rod 30 and the second shared discharge rod 40. The timing controller 10 controls the level signal of the first pin 11 to switch between a high level and a low level in a blanking time interval of each frame.

The power management chip 20 is used to invert the polarity of the voltages of the first shared discharge rod 30 and the voltage of the second shared discharge rod 40 in the blanking time interval of each frame under the control of the level signal of the first pin 11.

Specifically, in some embodiments, when the level signal of the first pin 11 is at a high level, the power management chip 20 outputs a positive voltage to the first shared discharge rod 30, and the power management chip 20 outputs a negative voltage to the second shared discharge rod 40. When the level signal of the first pin 11 is at a low level, the power management chip 20 outputs a negative voltage to the first shared discharge rod 30, and the power management chip 20 outputs a positive voltage to the second shared discharge rod 40. The positive voltage is positive 8 volts and the negative voltage is negative 6 volts.

The present application uses the timing controller 10 to control the level signal of the first pin 11 to switch between a high level and a low level in the blanking time interval of each frame, and the first pin 11 is directly electrically connected to the second pin 21. Therefore, the power management chip 20 can directly obtain the signal of the first pin 11. The timing controller 10 does not need to issue instructions to the power management chip 20 through the integrated circuit bus. The power management chip 20 reverses the polarity of the voltage of the first shared discharge rod 30 and the voltage of the second shared discharge rod 40 in the blanking time interval of each frame under the control of the level signal of the first pin 11. Therefore, the present application will not be disturbed by external signals in the process of realizing the inversion of the voltage polarity of the shared discharge rods, thereby solving issues of abnormal images of the display panel 1000.

In some embodiments, the timing controller 10 controls the level signal of the first pin 11 to switch between a high level and a low level according to a frame start signal of each frame. The frame start signal of each frame is located at the beginning of the blanking time interval of each frame. Therefore, after obtaining the frame start signal of each frame, the timing controller 10 can control the level signal of the first pin 11 to switch between the high level and the low level. It is conceivable that the blanking time interval of each frame can also be determined in other ways as long as the timing controller 10 can control the level signal of the first pin 11 to switch between a high level and a low level in the blanking time interval of each frame.

In some other embodiments of the present application, when the level signal of the first pin 11 is at a high level, the power management chip 20 outputs a negative voltage to the first shared discharge rod 30, and the power management chip 20 outputs a positive polarity voltage to the second shared discharge rod 40. When the level signal of the first pin 11 is a low level, the power management chip 20 outputs a positive voltage to the first shared discharge rod 30, and the power management chip 20 outputs a negative voltage to the second shared discharge rod 40.

Figure 2:
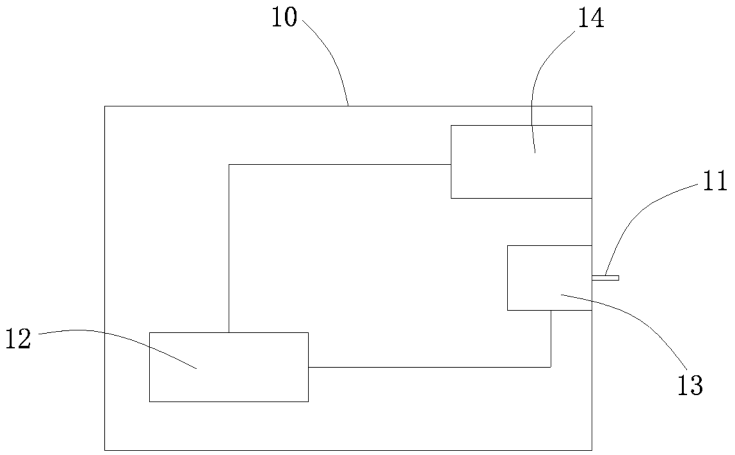
FIG. 2 is a schematic diagram of a timing controller of a driving circuit provided by the present application.

Refer to FIG. 2, which is a schematic diagram of a timing controller 10 of a driving circuit 100 provided by the present application. In some embodiments, the timing controller 10 includes:

- a controller 12;
- a register 13, wherein the controller 12 is electrically connected to the register 13, and the register 13 is electrically connected to the first pin 11.

Specifically, the controller 12 inputs data of a high-level signal or data of a low-level signal to the register 13 in the blanking time interval of each frame. For example, in the blanking time interval of the previous frame, the controller 12 inputs the data of the high-level signal to the register 13. Then, in the blanking time interval of the next frame, the controller 12 inputs the data of the low-level signal to the register 13. Therefore, the timing controller 10 controls the level signal of the first pin 11 to switch between a high level and a low level within the blanking time interval of each frame. The power management chip 20 is electrically connected to the first pin 11 through the second pin 21, so that a high-level signal or a low-level signal can be obtained. Thus, the polarity of the voltage of the first shared discharge rod 30 and the polarity of the voltage of the second shared discharge rod 40 are controlled to be reversed.

Still further, in some embodiments, the timing controller 10 further includes:

- a pulse signal generator 14 electrically connected to the controller 12.

Specifically, the pulse signal generator 14 is used for generating a frame start signal of each frame. In this way, the pulse signal generator 14 sends the frame start signal of each frame to the controller 12. The controller 12 then inputs the data of the high-level signal or the data of the low-level signal to the register 13 according to the frame start signal of each frame. In an embodiment of the present application, when the controller 12 receives the frame start signal of the previous frame, the controller 12 inputs the data of the high-level signal to the register 13. Then, when the controller 12 receives the frame start signal of the next frame, the controller 12 inputs the data of the low-level signal to the register 13. Thus, the timing controller 10 controls the level signal of the first pin 11 to switch between a high level and a low level according to the frame start signal of each frame. The power management chip 20 is electrically connected to the first pin 11 through the second pin 21, so that a high-level signal or a low-level signal can be obtained. Thus, the polarity of the voltage of the first shared discharge rod 30 and the polarity of the voltage of the second shared discharge rod 40 are controlled to be reversed.

Figure 3:
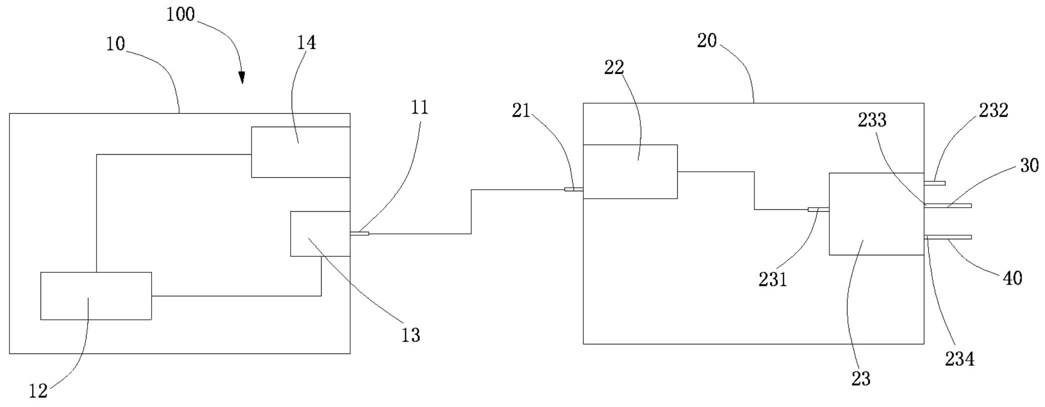
FIG. 3 is a schematic diagram of a first embodiment of a power management chip of a driving circuit provided by the present application.

Refer to FIG. 3, which is a schematic diagram of a first embodiment of a power management chip 20 of a driving circuit 100 provided by the present application. In some embodiments, the power management chip 20 further includes:

- a decoder 22, wherein an input terminal of the decoder 22 is electrically connected to the second pin 21;
- a voltage conversion circuit 23 including a first signal control terminal 231, a power access terminal 232, a first voltage output terminal 233, and a second voltage output terminal 234, wherein the first signal control terminal 231 is electrically connected to the output terminal of the decoder 22, the first voltage output terminal 233 is electrically connected to the first shared discharge rod 30, the second voltage output terminal 234 is electrically connected to the second shared discharge rod 40, the voltage conversion circuit 23 converts the voltage of the power access terminal 232 into a first voltage and a second voltage, the first voltage and the second voltage are voltages with opposite polarities, and the voltage conversion circuit 23 switches the voltage of the first voltage output terminal 233 and the voltage of the second voltage output terminal 234 between the first voltage and the second voltage under the signal control of the first signal control terminal 231.

That is, after receiving the level signal of the first pin 11 through the second pin 21 in the blanking time interval of each frame, the decoder 22 decodes the level signal of the first pin 11 to form a control signal. The signal is sent to the first signal control terminal 231 of the voltage conversion circuit 23. The voltage conversion circuit 23 switches the voltage of the first voltage output terminal 233 and the voltage of the second voltage output terminal 234 between the first voltage and the second voltage under the signal control of the first signal control terminal 231. Thus, the polarity inversion of the voltage of the first shared discharge rod 30 and the polarity inversion of the voltage of the second shared discharge rod 40 are controlled within the blanking time interval of each frame.

Further, in some embodiments, the voltage conversion circuit 23 includes a step-down control circuit. The step-down control circuit adopts the circuit of the prior art. The existing step-down control circuit can convert the high level of the power input terminal 232 into multiple voltages. The plurality of voltages include at least a first voltage and a second voltage. The step-down control circuit switches the voltage of the first voltage output terminal 233 and the voltage of the second voltage output terminal 234 between the first voltage and the second voltage under the signal control of the first signal control terminal 231.

Specifically, in an embodiment, when the level signal of the first pin 11 is at a high level, the step-down control circuit outputs a positive voltage to the first shared discharge rod 30, and the step-down control circuit outputs a negative voltage to the second shared discharge rod 40. When the level signal of the first pin 11 is at a low level, the step-down control circuit outputs a negative voltage to the first shared discharge rod 30, and the step-down control circuit outputs a positive voltage to the second shared discharge rod 40.

Figure 4:
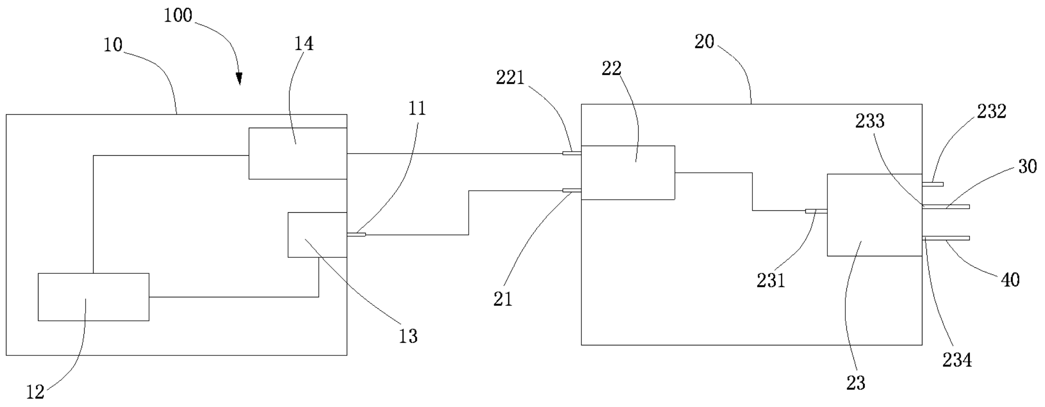
FIG. 4 is a schematic diagram of a second embodiment of a power management chip of a driving circuit provided by the present application.

Refer to FIG. 4, which is a schematic diagram of a second embodiment of a power management chip 20 of a driving circuit 100 provided by the present application. In some embodiments of the present application, the decoder 22 includes:

a second signal control terminal 221, wherein the second signal control terminal 221 is electrically connected to the pulse signal generator 14;

wherein the decoder 22 is used for decoding the level signal of the first pin 11 under the signal control of the second signal control terminal 221 and then sending it to the first signal control terminal 231.

That is, after receiving the level signal of the first pin 11 through the second pin 21, and at the same time, after the pulse signal generator 14 sends the frame start signal of each frame to the decoder 22, the decoder 22 decodes the level signal of the first pin 11 to form a control signal and sends it to the first signal control terminal 231 of the voltage conversion circuit 23.

Figure 5:
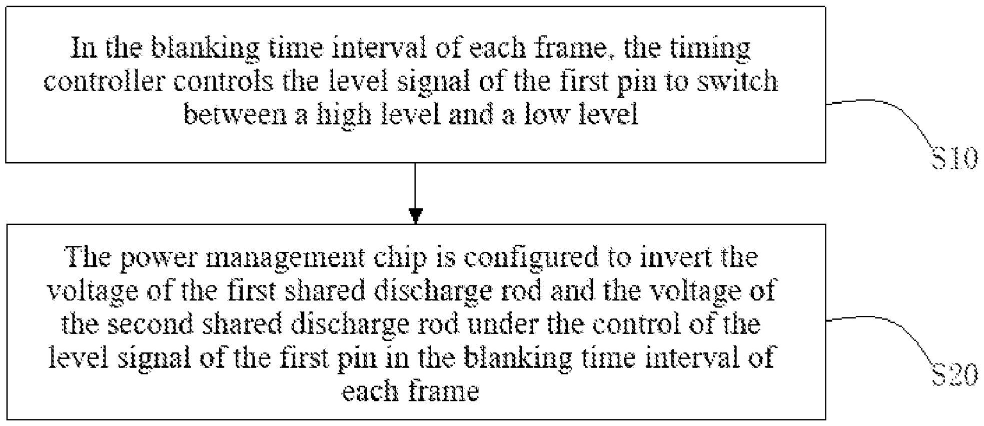
FIG. 5 is a flowchart of a driving method provided by the present application.

Refer to FIG. 1 and FIG. 5, FIG. 5 is a flowchart of a driving method provided by the present application. The embodiment of the present application also provides a driving method based on the above-mentioned driving circuit 100, which includes the following steps:

S10, in the blanking time interval of each frame, the timing controller 10 controls the level signal of the first pin 11 to switch between a high level and a low level;

S20, the power management chip 20 is configured to invert the voltage of the first shared discharge rod 30 and the voltage of the second shared discharge rod 40 under the control of the level signal of the first pin 11 in the blanking time interval of each frame.

In some embodiments, in the blanking time interval of each frame, the timing controller 10 controlling the level signal of the first pin 11 to switch between the high level and the low level comprises:

the timing controller 10 switching the level signal of the first pin 11 between the high level and the low level under a control of a frame start signal of each frame.

The frame start signal of each frame is located at the beginning of the blanking time interval of each frame. Therefore, after obtaining the frame start signal of each frame, the timing controller 10 can control the level signal of the first pin 11 to switch between the high level and the low level. It is conceivable that the blanking time interval of each frame can also be determined in other ways as long as the timing controller 10 can control the level signal of the first pin 11 to switch between a high level and a low level within the blanking time interval of each frame.

In some embodiments, the power management chip 20 configured to invert the voltage of the first shared discharge rod 30 and the voltage of the second shared discharge rod 40 under the control of the level signal of the first pin 11 in the blanking time interval of each frame comprises:

in the blanking time interval of each frame, when the level signal of the first pin 11 is at the high level, the power management chip 20 outputs a positive voltage to the first shared discharge rod 30, and the power management chip 20 outputs a negative voltage to the second shared discharge rod 40; when the level signal of the first pin 11 is at the low level, the power management chip 20 outputs the negative voltage to the first shared discharge rod 30, and the power management chip 20 outputs the positive voltage to the second shared discharge rod 40.

In some embodiments, the power management chip 20 configured to invert the voltage of the first shared discharge rod 30 and the voltage of the second shared discharge rod 40 under the control of the level signal of the first pin 11 in the blanking time interval of each frame comprises:

in the blanking time interval of each frame, when the level signal of the first pin 11 is at the high level, the power management chip 20 outputs a negative voltage to the first shared discharge rod 30, and the power management chip 20 outputs a positive voltage to the second shared discharge rod 40; when the level signal of the first pin 11 is at the low level, the power management chip 20 outputs the positive voltage to the first shared discharge rod 30, and the power management chip 20 outputs the negative voltage to the second shared discharge rod 40.

Figure 6:
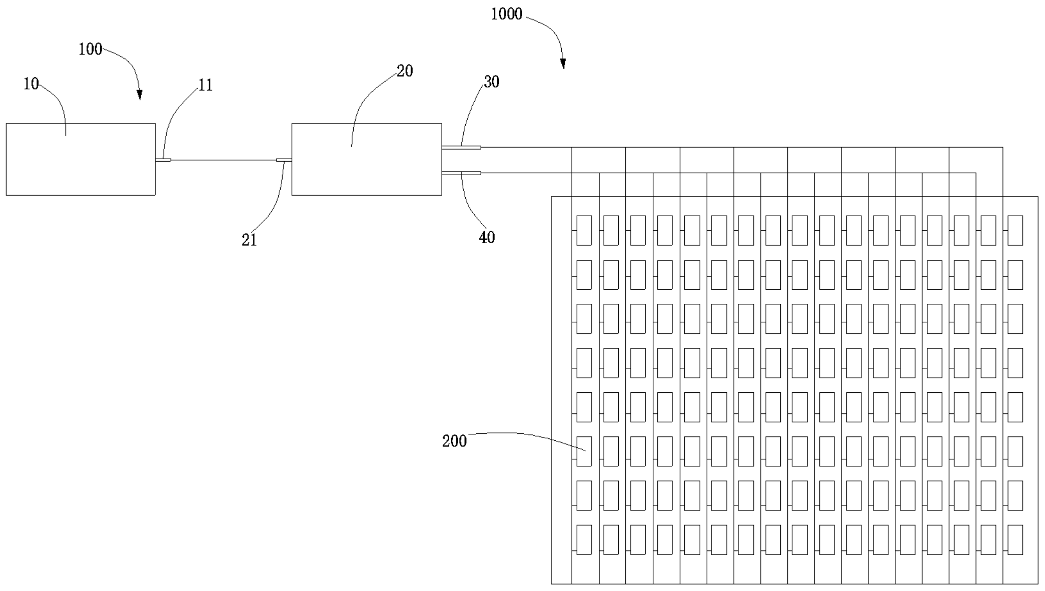
FIG. 6 is a schematic diagram of a display panel provided by the present application.

Refer to FIG. 6, which is a schematic diagram of a display panel 1000 provided by the present application. Correspondingly, an embodiment of the present application further provides a display panel 1000. The display panel 1000 includes a plurality of sub-pixels 200 arranged in an array and the above-mentioned driving circuit 100. The first shared discharge rod 30 of the driving circuit 100 is electrically connected to the sub-pixels 200 of a first column. The second shared discharge rod 40 of the driving circuit 100 is electrically connected to the sub-pixels 200 of a second column.

The sub-pixels 200 of the first column are adjacent to the sub-pixels 200 of the second column, and the voltages of the first and second shared discharge rods 30 and 40 are inverted in the blanking time interval of each frame following the data signal, thereby improving the display viewing angle.

The display panel provided by the embodiments of the present application has been described in detail above. Specific examples are used herein to illustrate the principles and implementations of the present application. The descriptions of the above embodiments are only used to help understand the method and the core idea of the present application. In addition, for those skilled in the art, according to the idea of the present application, there will be changes in the specific embodiments and application scope. In conclusion, the content of this specification should not be construed as a limitation on this application.

What is claimed is:

1. A driving circuit, comprising:

a timing controller comprising a first pin;

a power management chip comprising a second pin;

a first shared discharge rod, wherein the power management chip is electrically connected to the first shared discharge rod;

a second shared discharge rod, wherein the power management chip is electrically connected to the second shared discharge rod;

wherein the first pin is electrically connected to the second pin, the power management chip is configured to output voltages with opposite polarities to the first shared discharge rod and the second shared discharge rod at the same time, the power management chip is configured to invert a voltage of the first shared discharge rod and a voltage of the second shared discharge rod under a control of a level signal of the first pin in a blanking time interval of each frame;

wherein the timing controller comprises:

a controller;

a pulse signal generator electrically connected to the controller; and a register, wherein the controller is electrically connected to the register, and the register is electrically connected to the first pin;

wherein the power management chip further comprises:

a decoder, wherein an input terminal of the decoder is electrically connected to the second pin; and a voltage conversion circuit, wherein the voltage conversion circuit comprises a first signal control terminal, a power supply access terminal, a first voltage output terminal, and a second voltage output terminal, the first signal control terminal is electrically connected to an output terminal of the decoder, the first voltage output terminal is electrically connected to the first shared discharge rod, and the second voltage output terminal is electrically connected to the second shared discharge rod.

2. The driving circuit of claim 1, wherein the decoder comprises:

a second signal control terminal electrically connected to the pulse signal generator;

wherein the decoder is configured to decode the level signal of the first pin under a signal control of the second signal control terminal and then transmits the level signal of the first pin to the first signal control terminal.

3. A driving method of a driving circuit, wherein the driving circuit comprises:

a timing controller comprising a first pin;

a power management chip comprising a second pin;

a first shared discharge rod, wherein the power management chip is electrically connected to the first shared discharge rod;

a second shared discharge rod, wherein the power management chip is electrically connected to the second shared discharge rod;

wherein the first pin is electrically connected to the second pin, the power management chip is configured to output voltages with opposite polarities to the first shared discharge rod and the second shared discharge rod at the same time, the power management chip is configured to invert a voltage of the first shared discharge rod and a voltage of the second shared discharge rod under a control of a level signal of the first pin in a blanking time interval of each frame;

wherein the method comprises the following steps:

wherein in the blanking time interval of each frame, the timing controller controls the level signal of the first pin to switch between a high level and a low level;

wherein the power management chip is configured to invert the voltage of the first shared discharge rod and the voltage of the second shared discharge rod under the control of the level signal of the first pin in the blanking time interval of each frame;

in the blanking time interval of each frame, when the level signal of the first pin is at the high level, the power management chip outputs a negative voltage to the first shared discharge rod, and the power management chip outputs a positive voltage to the second shared discharge rod; when the level signal of the first pin is at the low level, the power management chip outputs the positive voltage to the first shared discharge rod, and the power management chip outputs the negative voltage to the second shared discharge rod.

4. The driving method of claim 3, wherein in the blanking time interval of each frame, the timing controller controlling the level signal of the first pin to switch between the high level and the low level comprises:

the timing controller switching the level signal of the first pin between the high level and the low level under a control of a frame start signal of each frame.

5. The driving method of claim 3, wherein the timing controller comprises:

a controller;

a register, wherein the controller is electrically connected to the register, and the register is electrically connected to the first pin.

6. The driving method of claim 5, wherein the timing controller further comprises:

a pulse signal generator electrically connected to the controller.

7. The driving method of claim 6, wherein the power management chip further comprises:

a decoder, wherein an input terminal of the decoder is electrically connected to the second pin;

a voltage conversion circuit, wherein the voltage conversion circuit comprises a first signal control terminal, a power supply access terminal, a first voltage output terminal, and a second voltage output terminal, the first signal control terminal is electrically connected to an output terminal of the decoder, the first voltage output terminal is electrically connected to the first shared discharge rod, and the second voltage output terminal is electrically connected to the second shared discharge rod.

8. The driving method of claim 7, wherein the decoder comprises:

a second signal control terminal electrically connected to the pulse signal generator;

wherein the decoder is configured to decode the level signal of the first pin under a signal control of the second signal control terminal and then transmits the level signal of the first pin to the first signal control terminal.

9. A display panel, wherein the display panel comprises a plurality of sub-pixels arranged in an array and a driving circuit, wherein the driving circuit comprises:

a timing controller comprising a first pin;

a power management chip comprising a second pin;

a first shared discharge rod, wherein the power management chip is electrically connected to the first shared discharge rod;

a second shared discharge rod, wherein the power management chip is electrically connected to the second shared discharge rod;

wherein the first pin is electrically connected to the second pin, the power management chip is configured to output voltages with opposite polarities to the first shared discharge rod and the second shared discharge rod at the same time, the power management chip is configured to invert a voltage of the first shared discharge rod and a voltage of the second shared discharge rod under a control of a level signal of the first pin in a blanking time interval of each frame;

wherein the first shared discharge rod of the driving circuit is electrically connected to the sub-pixels of a first column, and the second shared discharge rod of the driving circuit is electrically connected to the sub-pixels of a second column;

wherein the timing controller comprises:

a controller;

a pulse signal generator electrically connected to the controller; and a register, wherein the controller is electrically connected to the register, and the register is electrically connected to the first pin;

wherein the power management chip further comprises:

a decoder, wherein an input terminal of the decoder is electrically connected to the second pin; and a voltage conversion circuit, wherein the voltage conversion circuit comprises a first signal control terminal, a power supply access terminal, a first voltage output terminal, and a second voltage output terminal, the first signal control terminal is electrically connected to an output terminal of the decoder, the first voltage output terminal is electrically connected to the first shared discharge rod, and the second voltage output terminal is electrically connected to the second shared discharge rod.

10. The display panel of claim 9, wherein the decoder comprises:

a second signal control terminal electrically connected to the pulse signal generator;

wherein the decoder is configured to decode the level signal of the first pin under a signal control of the second signal control terminal and then transmits the level signal of the first pin to the first signal control terminal.

* * * * *